United States Patent [19]

Hartley

[11] 4,074,269

[45] Feb. 14, 1978

[54] BURGLAR ALARM FOR USE WITH AN AUTOMATIC GARAGE DOOR OPENER

[76] Inventor: Justin Hartley, 17 Fox Meadow Lane, West Hartford, Conn. 06107

[21] Appl. No.: 696,754

[22] Filed: June 16, 1976

[51] Int. Cl.[2] .............................................. H04B 7/00

[52] U.S. Cl. .................................... 343/225; 340/224; 340/164 A

[58] Field of Search ................ 343/225; 340/224, 220, 340/164 A, 310 R

[56] References Cited

U.S. PATENT DOCUMENTS

| | | | |
|---|---|---|---|
| 3,445,848 | 5/1969 | Goldstein | 343/225 |
| 3,795,896 | 3/1974 | Isaacs | 343/225 |
| 3,969,709 | 7/1976 | Isaacs et al. | 340/224 |
| 3,971,028 | 7/1976 | Funk | 343/225 |

*Primary Examiner*—Glen R. Swann, III

*Attorney, Agent, or Firm*—Lawrence A. Cavanaugh

[57] ABSTRACT

A burglar alarm generator is electrically connected to a conventional remote control automatic garage door opener to provide a visual and/or audible signal to deter potential burglars from the residence. The alarm generator (such as a siren or the like capable of providing a loud noise) is activated on command from a remote control transmitter typically used with automatic garage door openers. Circuitry within the alarm generator provides the capability to electrically bypass the alarm for operation of the opener in its normal mode. The alarm generator is capable of being energized and activated from within the residence.

9 Claims, 2 Drawing Figures

BURGLAR ALARM FOR USE WITH AN AUTOMATIC GARAGE DOOR OPENER

BACKGROUND OF THE INVENTION

The present invention relates to the field of burglar alarms and more specifically to a device, which, when attached to a standard automatic garage door opener, will, when energized, produce a siren alarm system to deter potential burglars.

Burglar alarms, which employ an electrically energized circuit, have become very popular in residential sections to signal to the police, private agencies and the like, that a particular residence has been broken into. The alarm systems also act as a deterrent such that when the alarm is activated. it will frighten the burglar or potential burglar and he will abandon his intent of burglarizing the residence. Normally, the alarm systems produce either an audible or visual signal, or turn on lights or the like when activated by some means. Systems of this type are usually expensive to purchase, install, and maintain and frequently are unreliable in operation. Also, the alarm systems usually require the installation of an independent energizing mechanism which become activated upon unauthorized intrusion into the premises.

It is the general purpose of this invention to provide a simple, inexpensive burglar alarm system which can be connected to a conventional radio controlled garage door opener by simply removing the light bulb in the automatic garage door opener and plugging the invention in to the light bulb socket. In normal operation, the electrical current which energizes the light bulb, now energizes and activates the burglar deterrent alarm.

SUMMARY OF THE INVENTION

A preferred embodiment of the present invention which will be subsequently described in greater detail, is described for an alarm system and has reference to a conventional automatic garage door opener having a radio control means of activation. Many buildings have a radio controlled garage door opener which turns on a light as the door opens. This invention substitutes an alarm generator for the light bulb. When the present invention is plugged into the automatic garage door opener light bulb socket and the alarm generator is not energized, the automatic garage door opener will operate in the conventional manner with the exception that the garage will be illuminated by a light bulb contained in the burglar deterrent alarm unit. When the garage door opens, the light bulb will be activated for the same period of time that the light bulb on the conventional door opener would have been activated. Thus when the alarm service is not desired, the usual function of the garage door opener passes through the invention and the garage door operates in the normal manner.

When the alarm system is desired, the home owner energizes the alarm system with a switch means preferably located at some convenient place within the house. Switch means could be located at several convenient positions throughout the building, any of which could energize the alarm system. A relay in the invention, when energized, inserts the alarm generator into the active circuit which produces a loud noise when the garage door opens. The loud noise coupled with the lighted garage should then frighten away any intruders.

The occupant of the building activates the garage door by the use of a remotely operated garage door opener transmitter which is supplied with the usual automatic garage door opener.

It is, therefore, an object of this invention to provide a relatively inexpensive electrically activated burglar deterrent alarm system.

Another object of the invention is to provide a burglar alarm which can be readily connected to commercially available automatic garage door openers.

Another object of the invention is to provide a burglar alarm system which can be energized by a switch means inside the building and activated by a remote garage door opener means from any location within the building.

Another object of the invention is to provide a burglar deterrent alarm system which produces an audible signal to deter potential burglars.

Another object of the invention is to provide a burglar deterrent alarm system which produces an audible and visual signal to deter potential burglars.

These, together with other objects, features and advantages of the present invention, will be more readily understood from the following detailed description, when taken in connection with the accompanying drawings wherein:

DESCRIPTION OF THE PREFERRED EMBODIMENT

Figure 1:
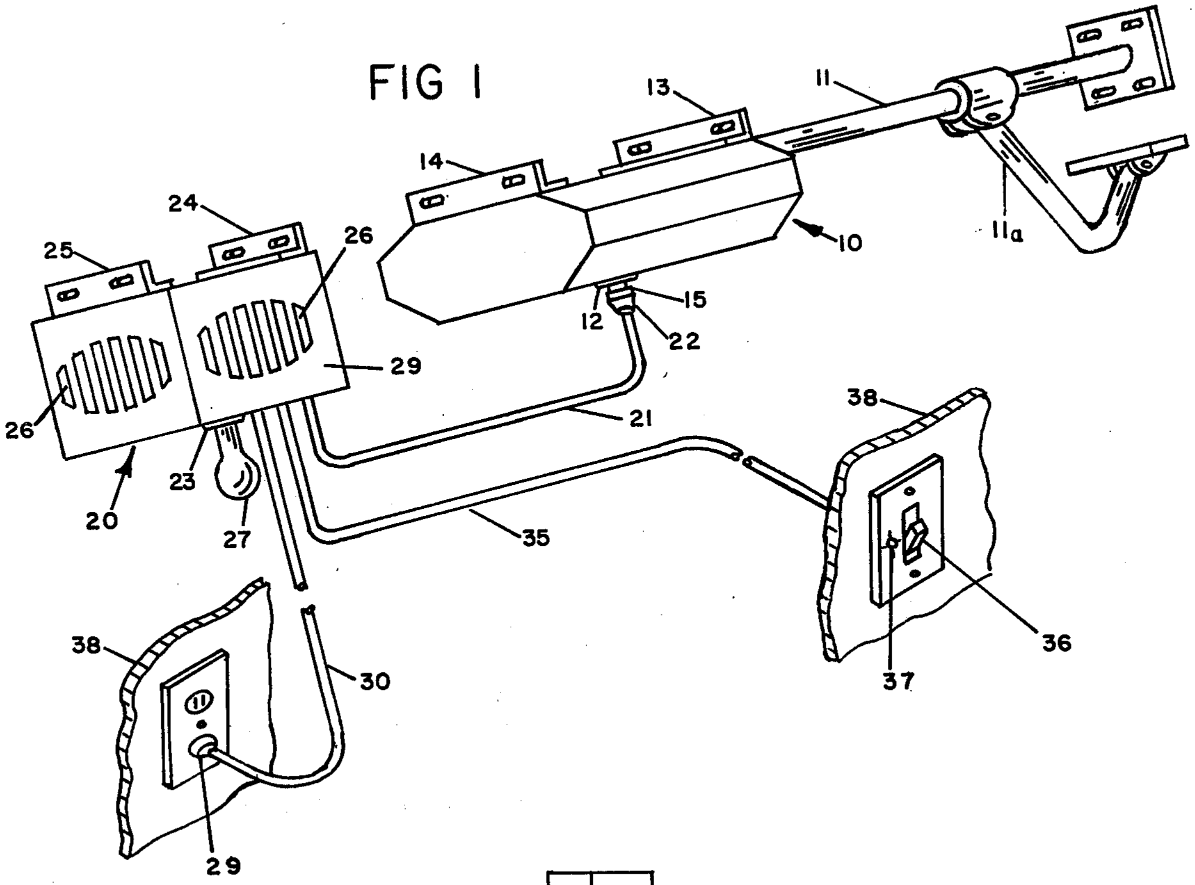
FIG. 1 is a view of the preferred burglar deterrent alarm system connected to an automatic garage door opener.

Referring now to the drawings, and, more particularly, to FIG. 1, which shows a perspective view of the burglar deterrent alarm with which the present invention is concerned, and its connection to a conventional automatic garage door opener. The automatic garage door opener contains a first engaging arm 11 attached to one end to the motor box 10 and having its second end attached to the garage door header (not shown). A second engaging arm 11*a* is slidably attached at one end to the first engaging arm 11 and its second end is fixedly attached to the garage door (not shown). When the garage door opener is activated, the second engaging arm 11*a* slides along the first engaging arm 1 which opens the garage door (not shown.) The motor box 10 contains a motor, drive mechanism, radio receiver and activating circuitry (all not shown) found in conventional automatic garage door opener devices. Mounting attachments 13 and 14 are provided to secure the door opener to the rafter of the garage.

When a signal from a remote radio control transmitter (not shown) is received at the receiver in the motor box 10, the electrical circuit is energized and the second engaging arm 11*a* opens the garage door. Simultaneously, electrical power is supplied to the light bulb socket 12. Normally, the conventional automatic garage door opener would contain a light bulb in the light bulb socket 12 which would be illuminated while the light circuit is energized. In the present invention, a light socket adapter 15 is inserted into the light bulb socket 12. An electrical cable 21, having a conventional plug 22 at one end, is inserted into the light socket adapter 15 and has its second end connected to the activating circuit within the burglar deterrent alarm housing 20. The housing 20 would usually be rectangular in shape but could be of any convenient shape and of a size sufficient to hold all the components of the invention.

The burglar deterrent alarm housing 20 will usually be located in close proximity to the motor box 10 and connected to the garage rafters using the mounting attachments 24 and 25. The burglar deterrent alarm housing 20 could also be mounted on any interior wall of the garage, or within the house. It could also be housed in a tamper-proof protected steel cabinet mounted on any exterior wall or on the roof. Connected to the activating circuit would be an alarm generator (not shown in FIG. 1) and a light socket 23 into which a light bulb 27 has been inserted. Elongated slots 26 in the housing walls 29 transmit the sound produced by the alarm generator (not shown) inside the housing 20. Electrical cable 30 is plugged at one end into any convenient 110 volt house outlet 29, preferably in close proximity to the burglar deterrent alarm. The second end of the electrical cable 30 is connected to the electrical circuit of the burglar deterrent alarm system as shown schematically in FIG. 2. Electrical cable 35 terminates at one end with a switch means 36 which is usually positioned at some convenient location on a wall 38 within the house. Switch means 36, when closed, energizes the burglar deterrent alarm system which, when activated by the opening of the garage door, produces the siren noise to deter a potential burglar. Associated with the switch means would be a visual lamp 37 which is energized when the switch is closed.

Figure 2:
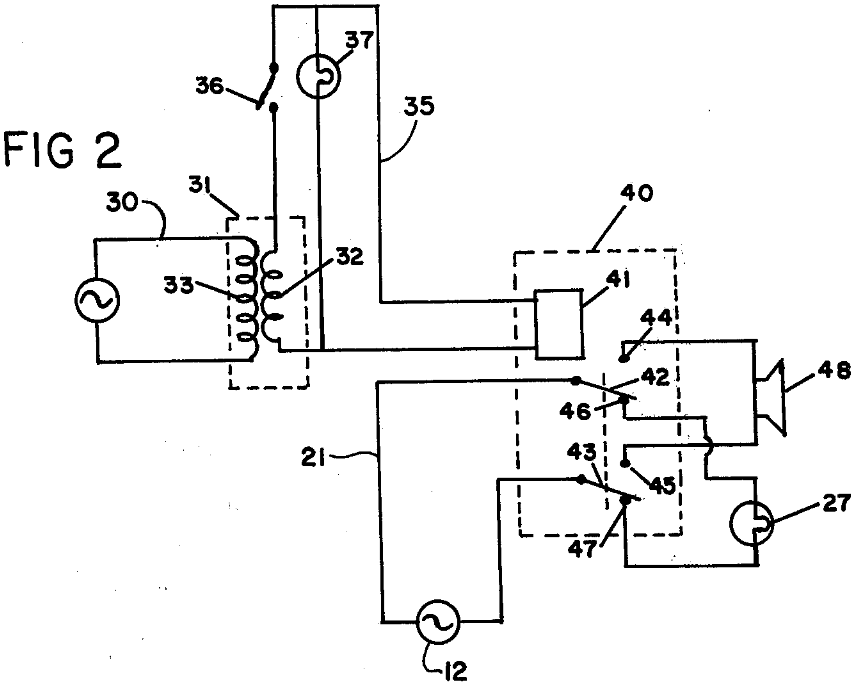
FIG. 2 is a view of the electrical schematic of the burglar deterrent alarm system.

FIG. 2 shows a preferred circuit for the burglar deterrent alarm. A 110/24 volt transformer 31 is connected to a 110 volt A.C. source by electrical cable 30 as shown in FIG. 1. This voltage source would normally be located in close proximity to the burglar deterrent alarm. However, close proximity of the electrical outlet is not necessary since the burglar deterrent electrical cord 30 could be of any length. Furthermore, an extension cord, not shown, could also be utilized. The windings of the transformer's secondary coil 32 are such that 24 volts will be impressed across it when 110 volts are impressed across the primary coil 33. This switch would normally be located on a wall 38 in FIG. 1 on the inside portion of the building. When the occupant of the building closes the switch 36, the alarm generator is then energized. As noted previously, this switch could be placed on any convenient wall in the building. A slight modification to the switch circuit would allow multiple switch locations throughout the building, anyone of which would energized the burglar deterrent alarm system. A 24 volt visual lamp 37 is connected across the 24 volt secondary coil 32 and the switch 36. When the switch is in the open position, no current flows through the visual lamp. When the switch 36 is closed, the visual lamp 37 is activated and gives a visual signal to the occupant of the building, that the burglar deterrent alarm system is energized.

The use of a 24 volt circuit for the switch minimizes the electrical potential in the circuit which minimizes the problems of installation by the homeowner.

The secondary coil 32 is connected through the switch 36 to a 24 volt double pole throw relay 40. When the switch 36 is open, the relay coil 41 is not activated and the 110 volt signal from the electric light bulb socket 12 in FIG. 1 passes through the armatures 42 and 43, through the non-activated contact positions 46 and 47 and energizes the light bulb 27. Light bulb 27 will be activated as long as light bulb socket 12 is energized.

When switch 36 is closed, a 24 volt signal is impressed on relay coil 41 and armatures 42 and 43 make contact with positions 44 and 45 respectively. When electric light bulb socket 12 is energized, alarm generator 48 such as a siren is also energized and produces a loud noise to deter potential burglars. In the preferred illustration, the alarm generator 48 will only be activated for the period of time the electric light bulb socket 12 in the automatic garage door opener is energized.

It is to be recognized that modifications to the electrical circuit can be made in that the alarm generator could be powered by a separate source of electrical current which is activated when the electric light bulb socket 12 is energized and switch 36 is closed. The alarm generator would then remain activated until the switch 36 is opened.

Also, in the preferred embodiment, the electric light 27 is energized only when the alarm generator circuit is not energized. Thus the light bulb is energized when the automatic garage door opener is operating in the normal manner. When the alarm generator circuit is activated, the light bulb 27 circuit is deactivated. It is to be recognized that modifications to the circuitry can be made to have the light bulb circuit activated in both modes of operation.

It can therefore be seen that in accordance with the present invention, there is provided a burglar deterrent alarm which can be readily attached to a conventional automatic garage door opener to provide an economical, easy to install and reliable burglar deterrent alarm system to frighten actual or potential burglars from a residence or building.

While the invention has been described with respect to a preferred physical embodiment, constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

What is claimed is:

1. A burglar alarm for use in combination with an automatic garage door opener comprising:

a housing, an alarm generator within the housing.

means for energizing the alarm generator whereby the alarm generator is capable of being activated by a signal from the automatic garage door opener, and means for communicating the signal from the automatic garage door opener to activate the energized alarm generator.

2. A burglar alarm as set forth in claim 1 wherein the means for energizing the alarm generator comprises:

means for inserting the alarm generator into a circuit, and switch means within the circuit for energizing the means for inserting the alarm generator into a circuit.

3. A burglar alarm as set forth in claim 2 wherein the switch means comprises:

a transformer having a primary coil and a secondary coil capable of transforming the voltage across the primary coil from a 110 volt a.c. source to at least 24 volts across the secondary coil, a switch having an open and closed position and capable of cooperating with the transformer for energizing the alarm generator, and a visual lamp capable of being energized when the switch is closed to provide a visual indication that the alarm generator is energized.

4. A burglar alarm as set forth in claim 1 wherein the alarm generator is a siren.

5. The invention in accordance with claim 2 wherein the means for inserting the alarm generator into a circuit is a double pole double throw relay.

6. The invention in accordance with claim 1 wherein the means for communicating the signal from the automatic garage door opener to activate the energized alarm generator is a cable having a plug on one end capable of being inserted into a light bulb socket in the automatic garage door opener and connected at the other end to the alarm generator.

7. A burglar alarm for use in combination with an automatic garage door opener comprising:

a housing, an alarm generator, a light socket within the housing capable of receiving a light bulb, a relay having armatures capable of moving from a first position for electrical connection to the alarm generator to a second position for electrical connection to the light socket, means for energizing the relay to move the armatures between the first position and the second position, and means for communicating the signal from the automatic garage door opener to the armatures for activating the alarm generator when the armatures are in the first position and for energizing the light socket to turn on a light bulb when the armatures are in the second position.

8. The invention in accordance with claim 7 wherein the means for energizing the relay comprises:

a source of a.c. voltage, a transformer connected to the source of voltage having a primary coil and a secondary coil capable of transforming the voltage across the primary coil to at least twenty four volt across the secondary coil, and a switch having an open and closed position and capable of cooperating with the transformer to energize the relay when the switch is in the closed position.

9. The invention in accordance with claim 8 wherein the means for communicating the signal from the automatic garage door opener to the armature is a cable having a plug on one end for insertion into the automatic garage door opener and electrically connected at the other end to the armatures.

* * * * *